(12) United States Patent
Wensing et al.

(10) Patent No.: US 8,403,396 B2
(45) Date of Patent: Mar. 26, 2013

(54) ROLLER CARRIAGE FOR A SLIDING BOW ROOF FOR A TRUCK OR TRUCK TRAILER

(75) Inventors: Udo Wensing, Oberhausen (DE); Hans Boris Hahnen, Kamp-Lintfort (DE); Frank Neumeyer, Willich (DE); Frank Frentzen, Viersen (DE); Rolf Birkenbach, Krefeld (DE); Joachim Rossbach, Viersen (DE); Karl Kemmerling, Solingen (DE); Axel Scholz, Moers (DE); Tim Lauterbach, Moenchengladbach (DE); Rolf Weigelt, Duisburg (DE)

(73) Assignee: VBG Group Truck Equipment GmbH, Krefeld (DE)

( * ) Notice: Subject to any disclaimer, the term of this patent is extended or adjusted under 35 U.S.C. 154(b) by 184 days.

(21) Appl. No.: 12/872,332

(22) Filed: Aug. 31, 2010

(65) Prior Publication Data

US 2011/0049926 A1    Mar. 3, 2011

(30) Foreign Application Priority Data

Sep. 2, 2009 (EP) .................................... 09011252

(51) Int. Cl.
*B60P 7/02* (2006.01)
(52) U.S. Cl. .................................................. 296/100.12
(58) Field of Classification Search ............. 296/100.12, 296/100.01, 100.11, 100.13, 100.16, 100.17, 296/136.03, 136.1, 104, 105; 105/150
See application file for complete search history.

(56) References Cited

U.S. PATENT DOCUMENTS

| | | | | |
|---|---|---|---|---|
| 1,863,957 | A * | 6/1932 | Woolcott | 296/105 |
| 4,342,480 | A * | 8/1982 | Ross, Jr. | 296/100.12 |
| 4,683,686 | A * | 8/1987 | Ozdemir | 52/64 |
| 4,711,484 | A * | 12/1987 | Tuerk | 296/105 |
| 4,902,064 | A * | 2/1990 | Tuerk et al. | 296/100.12 |
| 5,005,896 | A * | 4/1991 | Li | 296/100.18 |
| 5,152,575 | A * | 10/1992 | DeMonte et al. | 296/105 |
| 5,338,084 | A * | 8/1994 | Wardell | 296/105 |
| 5,538,313 | A * | 7/1996 | Henning | 296/100.12 |
| 5,546,972 | A * | 8/1996 | Wardell et al. | 135/129 |
| 5,685,227 | A | 11/1997 | Gaccetta et al. | |
| 5,924,759 | A * | 7/1999 | DeMonte et al. | 296/100.12 |
| 6,431,634 | B1 * | 8/2002 | Ananian | 296/100.12 |
| 6,471,282 | B2 * | 10/2002 | Hanning | 296/100.12 |
| 6,634,697 | B1 * | 10/2003 | Petelka | 296/100.12 |
| 6,981,734 | B2 * | 1/2006 | Martin | 296/100.12 |
| 7,374,225 | B2 * | 5/2008 | Petelka | 296/100.11 |

(Continued)

FOREIGN PATENT DOCUMENTS

FR    1 238 055    8/1960
FR    2 896 008    7/2007

*Primary Examiner* — Kiran B Patel
(74) *Attorney, Agent, or Firm* — Berenato & White, LLC

(57) ABSTRACT

The invention relates to a roller carriage for a sliding bow roof for a truck or truck trailer. The roof encompasses guidance and runner rails, extending on the cargo surface of the truck along the longitudinal sides of the cargo surface. Roller carriages, which comprise rollers and on which retaining bows, embodied in gantry fashion and having a roof tarpaulin mounted thereon, are displaceably guided. At least one roller carriage is equipped with a securing device for preventing inadvertent shifting of the roller carriage along the rails. The securing device encompasses a wedge element associated with a roller, which element is shiftable between a release position and a secured position. In its release position it has no contact with the roller. In its secured position a portion of the wedge element is between the roller and the corresponding guidance and runner rail.

14 Claims, 3 Drawing Sheets

U.S. PATENT DOCUMENTS

| | | |
|---|---|---|
| 7,484,789 B1 * | 2/2009 | Aulick .................. 296/100.11 |
| 8,171,947 B2 * | 5/2012 | Hardie ...................... 135/129 |
| 2006/0017303 A1 * | 1/2006 | Weege et al. ............... 296/105 |
| 2006/0261629 A1 * | 11/2006 | Lowry et al. ........... 296/100.12 |
| 2006/0273614 A1 * | 12/2006 | Tuerk et al. ............ 296/100.12 |
| 2007/0080557 A1 * | 4/2007 | Knepper et al. ............. 296/105 |
| 2009/0245700 A1 * | 10/2009 | Vogelgesang .................. 384/13 |
| 2010/0026037 A1 * | 2/2010 | Opie ..................... 296/100.12 |
| 2012/0137924 A1 * | 6/2012 | Boren et al. ................. 105/150 |

* cited by examiner

ROLLER CARRIAGE FOR A SLIDING BOW ROOF FOR A TRUCK OR TRUCK TRAILER

CROSS-REFERENCE TO RELATED APPLICATIONS AND CLAIM TO PRIORITY

This application is related to patent application number 09011252.5-1268 filed Sep. 2, 2009 with the European Patent Office, the disclosure of which is incorporated herein by reference and to which priority is claimed.

FIELD OF THE INVENTION

The present invention relates to a roller carriage for a sliding bow roof for a truck or truck trailer, which roof encompasses guidance and runner rails, extending on the cargo surface of the truck along the longitudinal sides of the cargo surface, in which the roller carriages, which comprise rollers and on which retaining bows, embodied in gantry fashion and having a roof tarpaulin mounted thereon, are displaceably guided, at least one roller carriage being equipped with a securing device for preventing inadvertent shifting of the roller carriage along the guidance and runner rails.

BACKGROUND OF THE INVENTION

Roller carriages of this kind, in which the securing device is embodied as a blocking element clampable against the guidance and runner rail, are known from practical use. This blocking element can be embodied as a screw that can either be pressed, by rotation, against the guidance and runner rail, or can be at a distance from it. A disadvantage in this context is that extended retention of the open roof is necessary until sufficiently clamping has been produced. In addition, accessibility is often limited and, with insufficient actuation and thus insufficient clamping, displacements can result in scraping on the guidance and runner rail and thus in damage to the guidance and runner rail.

These problems can also occur with blocking elements that, by way of a pivoting lever or push bar, press a rubber element onto the guidance and runner rail. Such blocking elements are furthermore subject to a bending load when used as intended, and functional impairments can occur as a result of wear on the rubber element.

Also known are blocking elements that are slid into a corresponding recess or bore of the guidance and runner rail and thus achieve positively engaged securing of the roller carriage. A disadvantage in this context is that another bore is required for each position, thereby weakening the guidance and runner rail. In addition, damage to the rollers can be caused by the bores because of sharp edges, and roller running can be interfered with.

SUMMARY OF THE INVENTION

It is an object of the invention to eliminate the aforesaid disadvantages and to describe a roller carriage with which, in simple fashion, inadvertent shifting of the roller carriage along the guidance and runner rails can be prevented.

This object is achieved in that the securing device encompasses a wedge element associated with a roller, which element is shiftable between a release position and a secured position, and in its release position has no contact with the roller, whereas in its secured position a portion of the wedge element is arranged between the roller and the corresponding guidance and runner rail. This on the one hand enables the roller carriage to be secured in any desired position. In addition, no weakening of the guidance and runner rail occurs, since bores are not required nor can scraping take place if blocking element is incompletely blocked. The self-locking property is utilized because of the wedge-shaped configuration of the wedge element, so that upon shifting in the one direction the wedge element exerts a braking action, and upon shifting in the other direction it automatically releases.

The wedge element can preferably be connected to a lever pivotably about a rotation axis, or mounted on said lever, the lever being arranged pivotably about a pivot bearing arranged at a distance from the rotation axis. The result is that shifting of the wedge element between its release position and its secured position is easily possible, and actuation by means of a lever means that only a small force is necessary for that purpose.

According to the present invention at least one guidance element, which ensures alignment of the wedge element and at least substantially prevents any pivoting of the wedge element other than that predetermined by the rotation axis, can be provided, so that in its release position the wedge element also has no contact with the guidance and runner rail.

The guidance element can be embodied as a projection that is arranged on the roller carriage and in particular is manifested in rod-shaped fashion, and an oblique surface coacting with the projection can be provided on the wedge element, so that upon pivoting of the lever a corresponding "steering" influence on the wedge element is produced.

In a preferred exemplifying embodiment of the invention, a locking element can be provided for securing the wedge element in its release position, so that inadvertent shifting into the secured position is not possible.

The locking element can be constituted by the guidance element, and can be embodied to coact with a corresponding recess in the wedge element, so that automatic locking upon shifting into the release position occurs.

The locking element can also encompass a spring element that prevents inadvertent shifting into the secured position.

The invention further relates to a sliding bow roof for a truck or truck trailer, which roof encompasses guidance and runner rails, extending on the cargo surface of the truck along the longitudinal sides of the cargo surface, in which roller carriages, comprising rollers and having retaining bows respectively embodied in gantry fashion and having a roof tarpaulin mounted on the retaining bows, are displaceably guided, at least one roller carriage being equipped with a securing device for preventing inadvertent shifting of the roller carriage along the guidance and roller rails.

In order to eliminate the disadvantages recited above, and in order to achieve the object of the present invention, the roller carriage is intended to be embodied in accordance with the present invention.

BRIEF DESCRIPTION OF THE FIGURES

Exemplifying embodiments of the invention, depicted in the drawings, are explained below.

DETAILED DESCRIPTION OF THE PREFERRED EMBODIMENT(S)

Figure 1:
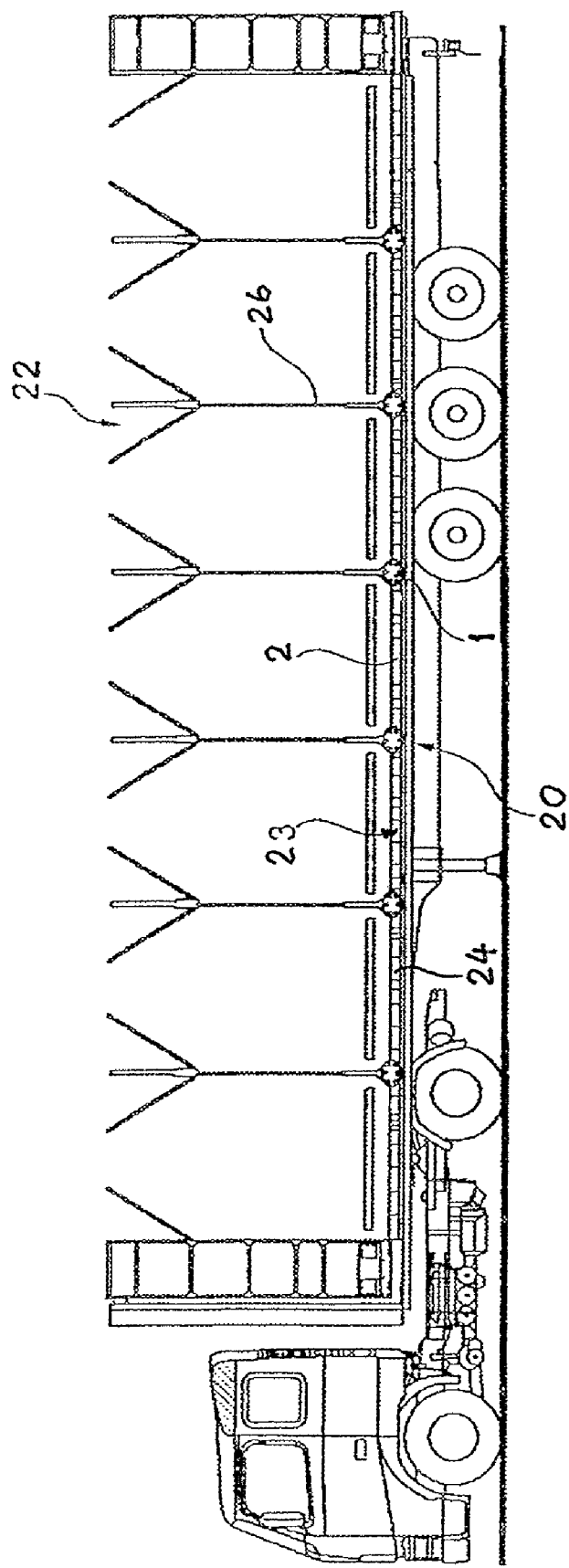
FIG. 1 shows a truck trailer attached to a truck, the truck trailer having a sliding bow roof according to the present invention.

Matching reference characters are used in all the Figures for identical or similar components.

FIG. 1 shows a number of roller carriages 1 for a sliding bow roof 22 for a truck or truck trailer 20.

Figure 2:
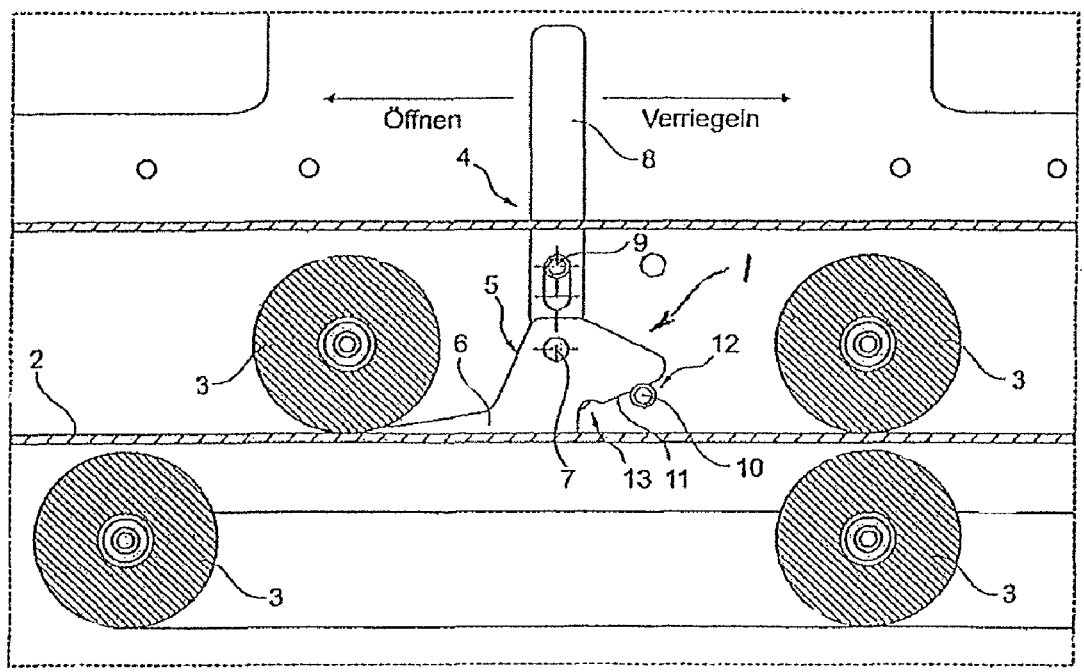
FIG. 2 shows a first exemplifying embodiment of a roller carriage according to the present invention having a securing device.

Encompassed for this purpose on a cargo surface 23 of the truck 20 are guidance and runner rails 2, extending along longitudinal sides 24 of the cargo surface 23. As shown in FIGS. 1 and 2, rollers 3 of each of the roller carriages 1 are displaceably guided in the guidance and runner rails 4. Each of the roller carriages 1 is provided with a retaining bow member 26 positioned thereon. The retaining bow members 26 span the width of the cargo surface 23 and, by means of the roller carriages 1, are positioned so as to be displaceable in the guidance and runner rails 2. The roller carriage 1 is equipped with a securing device 4 for preventing inadvertent shifting of the roller carriage 1 along the guidance and runner rails 2.

The securing device 4 encompasses a wedge element 5 that has one of the rollers 3 associated with it and that is shiftable between a release position and a secured position. In the secured position depicted in the drawings, a correspondingly wedge-shaped portion 6 of wedge element 5 is arranged between the roller 3 and the corresponding guidance and runner rail 2, so that securing of the roller carriage 1 is accomplished because of the self-locking property, and shifting in the direction of the wedge element 5 is not possible, or possible only to a very small extent.

The wedge element 5 is connected, pivotably about a rotation axis 7, to a lever 8, the lever 8 being arranged pivotably about a pivot bearing 9 arranged at a distance from the rotation axis 7. In the exemplifying embodiment depicted, the pivot bearing 9 is constituted by a stud, mounted on the roller carriage 1, on which the lever 8 is journaled by means of an elongated hole.

A shifting of wedge element 5 between its release position and its secured position is thus possible in simple fashion, and thanks to actuation by means of a lever 8, only a small force is necessary in order to shift wedge element 5.

Also provided is a guidance element 10 that ensures alignment of wedge element 5 and at least substantially prevents any pivoting of wedge element 5 other than that predetermined by rotation axis 7, so that in its release position, wedge element 5 also has no contact with guidance and runner rail 2.

In the exemplifying embodiment depicted, guidance element 10 is embodied as a projection that is arranged on roller carriage 1 and is manifested in rod-shaped fashion.

Provided on wedge element 5 is an oblique surface 11 coacting with guidance element 10, so that upon pivoting of lever 8 a corresponding "steering" influence on wedge element 5 is produced. Also provided is a locking element 12 for retaining wedge element 5 in its release position, so that inadvertent shifting into the secured position is not possible.

Locking element 12 can be constituted by guidance element 10, and can be embodied to coact with a corresponding recess 13 or the like in wedge element 5, so that automatic locking upon shifting of wedge element 5 into the release position occurs.

Figure 3:
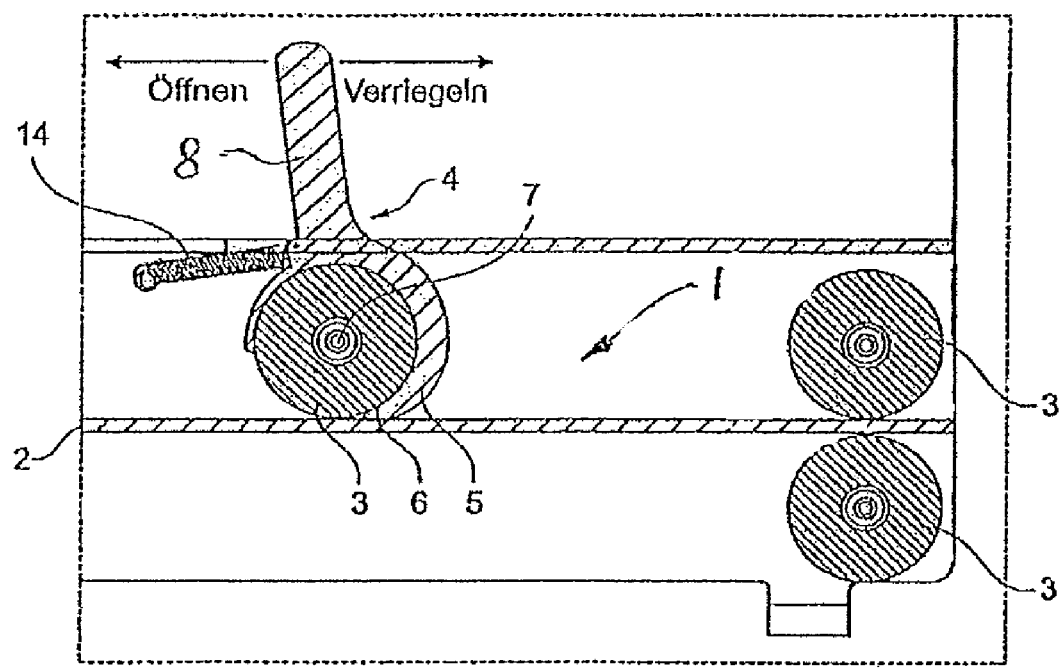
FIG. 3 shows a second exemplifying embodiment of a roller carriage according to the present invention having a securing device.

FIG. 3 depicts an alternative exemplifying embodiment in which the wedge element 5 of the securing device 4, which element has a roller 3 associated with it and is shiftable between a release position and a secured position, is embodied as a wedge proceeding along a track curved in the shape of a circle segment.

The drawing FIG. 3 depicts the secured position, in which the correspondingly wedge-shaped portion 6 of the wedge element 5 is arranged between the roller 3 and the corresponding guidance and runner rail 2, so that securing of the roller carriage 1 is accomplished because of the self-locking property, and shifting in the direction of the wedge element is not possible, or possible only to a very small extent.

The wedge element 5 is connected, pivotably about the rotation axis 7, to the lever 8; the rotation axis 7 of the wedge element 5 coincides with the rotation axis of the roller 3, since the wedge element 5 is journaled on the roller 3 by means of a correspondingly configured inner contour.

In order to reduce the risk of inadvertent securing, shifting of the wedge element 5 is possible only against the return force of a retention element that is embodied, in the exemplifying embodiment depicted, as a helical tension spring 14. Other variants, for example using a friction element or the like, are of course also possible, and other types of spring, for example leaf springs, compression springs, etc. can also be utilized.

A shifting of wedge element 5 between its release position and its secured position is thus possible in simple fashion, and thanks to actuation by means of a lever 8, only a small force is necessary in order to shift wedge element 5.

We claim:

1. A roller carriage (1) for a sliding bow roof for a truck or truck trailer, the roof including guidance and runner rails (2) extending on a cargo surface of the truck along longitudinal sides of the cargo surface, the roller carriage (1) comprising rollers (3) and mounted on the guidance and runner rails (2) and thereby displaceably guided, the roller carriage (1) being equipped with a securing device (4) for preventing inadvertent shifting of the roller carriage (1) along the guidance and runner rails (2);

the securing device (4) including a wedge element (5) associated with one of the rollers (3), the wedge element shiftable between a release position and a secured position;

in its release position the wedge element has no contact with the roller (3), whereas in its secured position a portion of the wedge element (5) is arranged between the roller (3) and the corresponding guidance and runner rail (2).

2. The roller carriage (1) according to claim 1, wherein the wedge element (5) is connected to a lever (8) pivotably about a rotation axis (7).

3. The roller carriage (1) according to claim 2, wherein the lever (8) is arranged pivotably about a pivot bearing (9) arranged at a distance from the rotation axis (7).

4. The roller carriage (1) according to claim 1, further comprising at least one guidance element (10), which ensures alignment of the wedge element (5) and at least substantially prevents any pivoting of the wedge element (5) other than that predetermined by the rotation axis (7).

5. The roller carriage (1) according to claim 4, wherein the guidance element (10) is embodied as a projection arranged on the roller carriage (1) and is rod-shaped, and wherein an oblique surface (11) coacting with said projection is provided on the wedge element (5).

6. The roller carriage (1) according to claim 1, wherein a locking element (12) is provided for securing the wedge element (5) in its release position.

7. The roller carriage (1) according to claim 4, wherein the locking element (12) is constituted by the guidance element (10), and is embodied to coact with a corresponding recess (13) in the wedge element (5).

8. The roller carriage (1) according to claim 2, wherein at least one guidance element (10), which ensures alignment of the wedge element (5) and at least substantially prevents any pivoting of the wedge element (5) other than that predetermined by the rotation axis (7), is provided.

9. The roller carriage (1) according to claim 3, wherein at least one guidance element (10), which ensures alignment of the wedge element (5) and at least substantially prevents any pivoting of the wedge element (5) other than that predetermined by the rotation axis (7), is provided.

10. The roller carriage (1) according to claim 2, wherein a locking element (12) is provided for securing the wedge element (5) in its release position.

11. The roller carriage (1) according to claim 3, wherein a locking element (12) is provided for securing the wedge element (5) in its release position.

12. The roller carriage (1) according to claim 4, wherein a locking element (12) is provided for securing the wedge element (5) in its release position.

13. The roller carriage (1) according to claim 5, wherein a locking element (12) is provided for securing the wedge element (5) in its release position.

14. The roller carriage (1) according to claim 12, wherein the locking element (12) is constituted by the guidance element (10), and is embodied to coact with a corresponding recess (13) in the wedge element (5).

* * * * *